United States Patent
Terada et al.

[11] Patent Number: 5,485,389
[45] Date of Patent: Jan. 16, 1996

[54] MANUAL FEEDING METHOD FOR ROBOTS

[75] Inventors: Tomoyuki Terada; Hirotsugu Kaihori, both of Oshino, Japan

[73] Assignee: Fanuc Ltd., Yamanashi, Japan

[21] Appl. No.: 193,210

[22] PCT Filed: Jun. 11, 1993

[86] PCT No.: PCT/JP93/00787

§ 371 Date: Feb. 14, 1994

§ 102(e) Date: Feb. 14, 1994

[87] PCT Pub. No.: WO93/25356

PCT Pub. Date: Dec. 23, 1993

[30] Foreign Application Priority Data

Jun. 17, 1992 [JP] Japan .................................. 4-181576

[51] Int. Cl.$^6$ ........................ G05B 19/4061; G06F 19/00
[52] U.S. Cl. ................... 364/474.2; 318/568.24; 364/461; 395/83; 395/90
[58] Field of Search .................. 364/474.2, 167.01, 364/191–193, 461, 474.3; 395/83, 90; 901/3–5, 8; 318/568.11, 568.13, 568.14, 568.24, 571

[56] References Cited

U.S. PATENT DOCUMENTS

| 4,578,757 | 3/1986 | Stark | 395/90 X |
| 4,644,237 | 2/1987 | Frushour et al. | 395/90 |
| 4,694,232 | 9/1987 | Suzuki et al. | 395/80 X |
| 4,888,707 | 12/1989 | Shimada | 395/90 |
| 5,247,608 | 9/1993 | Flemming et al. | 395/90 |

FOREIGN PATENT DOCUMENTS

| 0346839 | 12/1989 | European Pat. Off. . |
| 62-94288 | 4/1987 | Japan . |
| 62-159203 | 7/1987 | Japan . |
| 63-256384 | 10/1988 | Japan . |
| 63-261403 | 10/1988 | Japan . |
| 63-267183 | 11/1988 | Japan . |

OTHER PUBLICATIONS

Patent Abstracts of Japan, vol. 10, No. 316 (P–510) Oct. 28, 1986 and JP–A–61 127 007 Jun. 14, 1986.

*Primary Examiner*—Joseph Ruggiero
*Attorney, Agent, or Firm*—Staas & Halsey

[57] ABSTRACT

A method of manually feeding robots to ensure an efficient and safe teaching operation for each robot, even when the multiplicity of robots are arranged close to each other. As long as a controller B receives a manual feed command, coordinates representing current positions of feature points Pi and Qj defined on the robots A1 and A2 are sequentially simulated for being updated and stored in the RAM. The distances R between the feature points Pi (i=1 to final value) and feature points Qj (j=1 to final value) are determined sequentially. Each time a smaller distance between the feature points is calculated, the value is updated and stored into the register R min to calculate a shortest distance between the robots A1 and A2. The actual manual feed rate V is increased or decreased in response to the value of the shortest distance R min.

9 Claims, 8 Drawing Sheets

| NAME OF ROBOT | NAME OF ROBOTS SUBJECTED TO INTERFACE |
|---|---|
| A1 | A2, A3, A4 |
| A2 <br> ⋮ | A1, A3, A5 <br> ⋮ |
| Ak <br> ⋮ | Ak−1, Ak+3, Ak+5 <br> ⋮ |
| An | An−1, An−2 |

MANUAL FEEDING METHOD FOR ROBOTS

TECHNICAL FIELD

The present invention relates to an improvement of a manual feeding method for robots.

BACKGROUND ART

In general, in manually feeding a robot for a teaching operation, an operator selects a feed rate by operating an override key on a console panel or the like, and then operates manual feed keys associated with the individual axes of the robot to operate the axes either individually or in an interlocked manner. As safety measures for reducing damage, which may occur by collision of the robots during the teaching operation, it is known in the art to restrict the upper limit of the override value selectable for an operator in the teaching mode within a preset acceptable range.

In the actual teaching operation, when there are no obstacles in the vicinity of the robot as an object of the teaching operation, the operator will set a large override value within an acceptable range, thereby operating the robot at a relatively high manual feed rate for efficient teaching operation. If there are any obstacles in the region of the robot as an object of the teaching operation and, if the robot is approaching the obstacles during the manual feed of the robot, the operator must set the override value to a smaller value to operate the robot at a relatively low manual feed rate, thereby securing a safety against collision.

Recently, however, it has become a common practice to closely arrange a multiplicity of robots for saving the working space and working time, which naturally necessitates the teaching operations of the individual robots in a state where a plurality of robots interfere with one another. In this case, for the robot as an object of the teaching operation, all other robots located around the robot can be obstacles. In particular, where a plurality of robots are to undergo teaching operations at a time, for example, in such a case where the teaching operation of a first robot is temporarily stopped and then resumed after finishing the teaching operation of a second robot, positional relationships between the first robot and other robots at the time when the teaching operation of the first robot is stopped temporarily may differ variously from positional relationships between the first robot and other robots at the time when resuming the teaching operation of the first robot. More specifically, in such a case, the distances may vary between the robot as an object of the teaching operation on and other robots as obstacles. Thus, if it is desired to advance the teaching operation effectively and safely, there must be a resetting of the override value of the robot as an object of the next teaching operation each time the position and posture of one robot is changed. This method, however, makes the resetting operation itself complicated and may result in a decrease of the working efficiency of the entire teaching operation.

On the other hand, if the selective override value is fixedly set at a low level, a teaching operation will be unable to be performed at a high speed even when there is an ample space around the robots. If a teaching operation is carried out with the override value selected for a high-speed feeding in disregard of the surrounding conditions, the robot will suffer great damage if an inadvertent collision occurs.

DISCLOSURE OF THE INVENTION

The present invention provides a method of manually feeding robots, ensuring an efficient and safe teaching operation for each robot, without requiring any troublesome setting operation even when the multiplicity of robots are arranged close to each other.

A method of manually feeding robots according to the present invention includes automatically finding a shortest distance between a robot, for which a manual feed command is inputted by an operator and another robot based on current positions and postures of the plurality of robots; setting a manual feed rate lower as the shortest distance decreases; and performing a manual feed of the robots at the set manual feed rate.

The manual feed rate can be determined by multiplying a reference value of manual feed rates commanded by the operator by a coefficient which monotonously increases as the shortest distance increases. The manual feed rate may be set lower than the reference value of the manual feed rates only when the shortest distance is shorter than a set distance. By setting the manual feed rate in this manner, a relatively high-speed manual feed operation becomes possible when there exists a sufficient space between the robots.

With the arrangement of the present invention, there is no need for an operator to reset the feed rate for the robot, as an object of the teaching operation, even when the distance between the robots has varied due to the change in the positions and postures of the robots. Moreover, the manual feeding of the robots can always be performed safely and at a speed assuring efficient operation, so that the requirements for high speed operation and safety can be satisfied simultaneously.

BEST MODE FOR CARRYING OUT THE INVENTION

Figure 1:
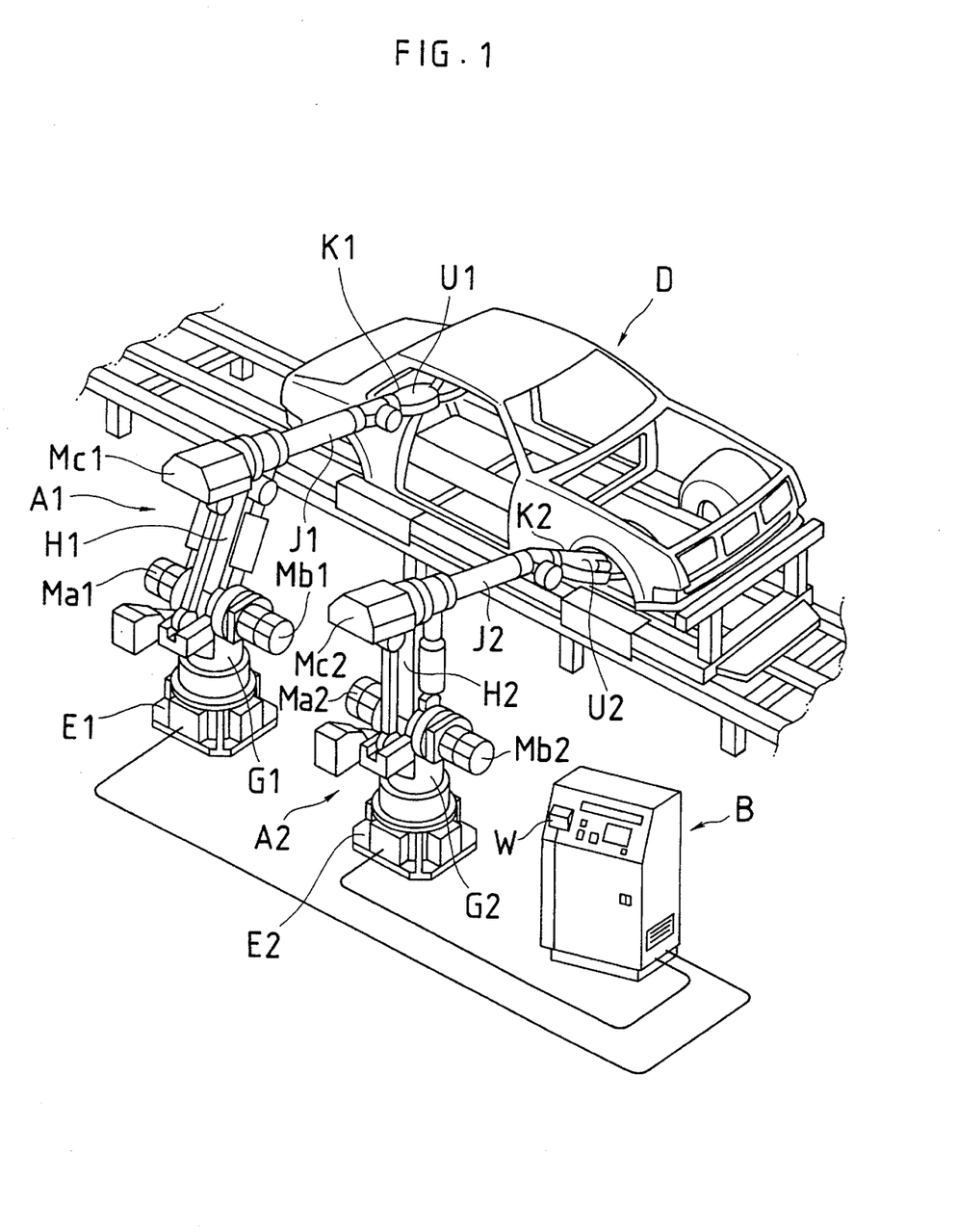
FIG. 1 is a perspective view showing a couple of industrial robots arranged within areas such that possibility of interfering with each other exists.

In FIG. 1, a couple of industrial robots A1 and A2 are arranged in a region wherein there is the possibility of mutual interference in carrying out a spot welding onto an automobile body D moving along an assembly line.

The industrial robot A1 includes a base E1 fixedly secured to a floor surface, a shoulder G1 mounted on the base E1 and capable of rotating around a vertical axis, an arm H1 mounted on the shoulder to be capable of swinging in a vertical plane, a fore arm J1 attached to the distal end of the arm Hi to be capable of swinging in a vertical plane, a wrist K1 connected to the distal end of the fore arm J1 providing two different degrees of freedom of rotation to allow an arbitrary change in its posture, and servomotors Ma1 to Mc1 for driving individual joints, The industrial robot A2, in the same manner as the robot A1, comprises a base E2, a shoulder G2, an arm H2, a fore arm J2, a wrist K2, and servomotors Ma2 to Mc2.

The shoulders G1 and G2, the arms H1 and H2, the forearms J1 and J2, and the wrists K1 and K2 constitute link mechanisms for the robots A1 and A2, respectively. The wrist K1 and K2 as effectors are equipped with spot welders U1 and U2 respectively.

The industrial robots A1 and A2 are drivingly controlled separately or in cooperation by a single robot controller B. A teaching console panel W for executing the teaching operation or manual feed operation for the industrial robots A1 and A2 is detachably mounted on the robot controller B and connected with the controller B by a cord.

The robot controller B includes a CPU acting as a control means, a ROM for storing drive control programs for the industrial robots A1 and A2, a nonvolatile RAM for storing teaching data, simulation data, etc., and an interface for interconnecting the two robots.

An embodiment of a method according to the present invention will now be described with reference to the configurations of the two robots shown in FIG. 1.

In this embodiment, a manual feed rate of a robot as an object of the teaching operation is determined based on a shortest distance between the robots calculated according to the coordinates representing current positions of feature points.

First, several feature points Pi (i=1 to an arbitrary final value) are defined on the shoulder G1, the arm H1, the fore arm J1, the wrist K1, the servomotors Ma1, Mb1, Mc1, and the spot welder U1 as the effector, which altogether constitute the link mechanism for the industrial robot A1. Similarly, several feature points Qj (j=1 to an arbitrary final value) are defined on the shoulder G2, the arm H2, the fore arm J2, the wrist K2, the servomotors Ma2, Mb2, and Mc2, and the spot welder U2, respectively, of the industrial robot A2. Thus defined feature points Pi and Qj are stored as shape data for the industrial robots A1 and A2, respectively, in the nonvolatile RAM of the robot controller B. Then, based on the current positions and postures of the industrial robots A1 and A2, all the coordinates representing the current positions of the feature points are calculated, for example, for each shaft interpolating period using well known simulation function, and updated for storage in the nonvolatile RAM of the robot controller B, It is preferable for the positions defining the feature points Pi to Qj to be the positions directly representing the contours of protruding members such as the links of the industrial robots A1 and A2 and the servomotors, and the effectors. By way of example, they may be provided on both ends or both side portions of the links, servomotors, and the effectors.

Figure 2:
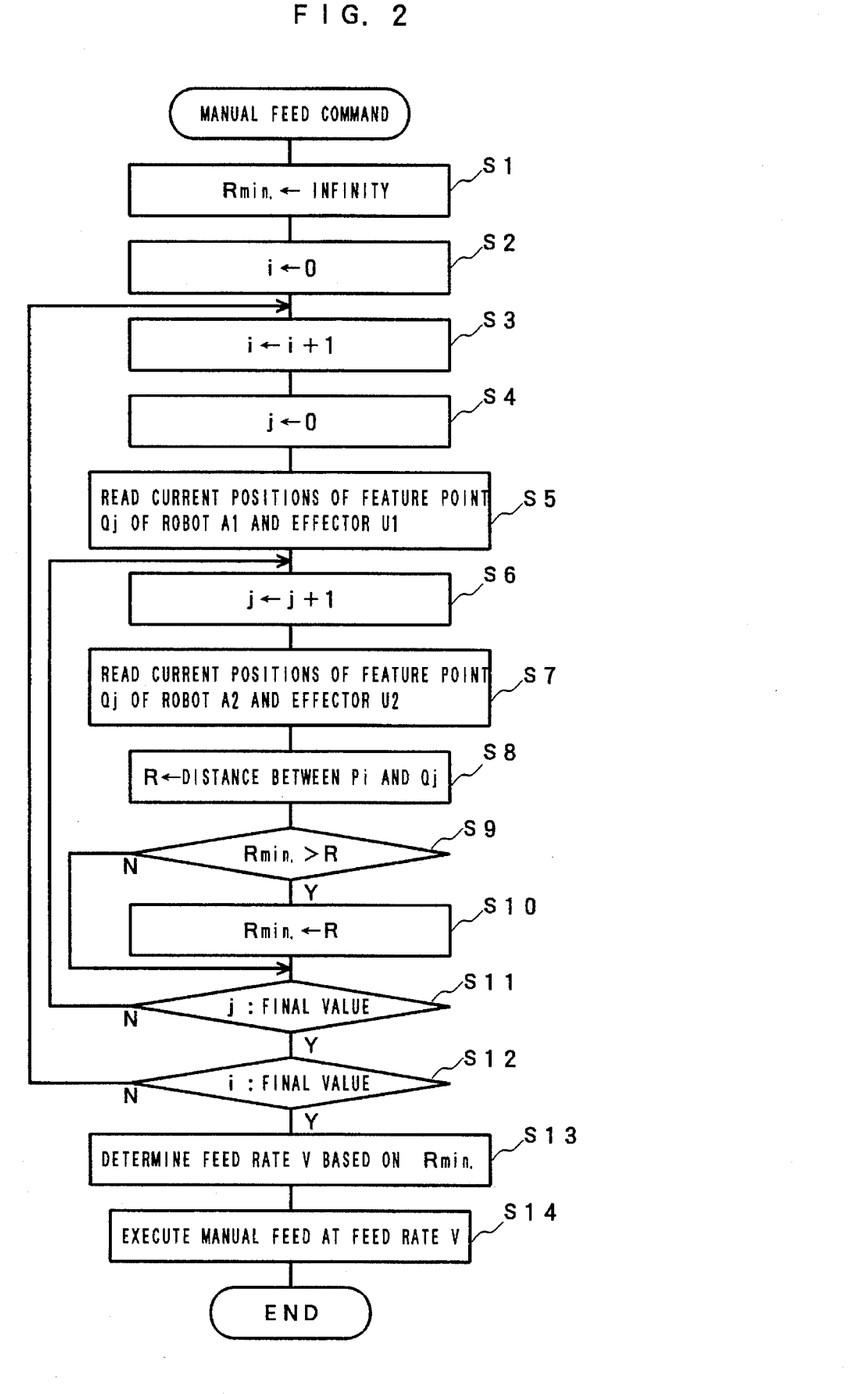
FIG. 2 is a flowchart showing a manual feed processing in accordance with an embodiment of the present invention.

FIG. 2 is a flowchart showing a "manual feed processing" to be repeatedly executed by the CPU of the robot controller B for each predetermined period while an operator operates the teaching console panel W for the input of manual feed commands to the industrial robot A1 or A2. The program for this processing as a part of the drive control program is stored in the ROM of robot controller B.

When the manual feed commands are detected through the teaching console panel W, in step S1, the CPU of the robot controller B initially sets, in a shortest distance storage register R min, a possible maximum set value permitted by the system, and initializes the value of an retrieval index i to "0" in step 2. Then, in step S3, the CPU increments the value of the index i by "1", and initializes the value of the retrieval index j to "0" in step S4.

In step S5, based on the value of the retrieval index i, the CPU reads a coordinates representing a current position of the i-th feature point associated with the industrial robot A1 from the nonvolatile RAM, and temporarily stores them therein. Then, after incrementing the value of the retrieval index j by "1" in step S6, control program advances to step S7, in which, based on the value of the index j, the CPU reads coordinates representing a current position of the j-th feature point Qj associated with the industrial robot A2 from the nonvolatile RAM. In step S8, the CPU calculates a distance between the feature points Pi and Qj based on the coordinates representing the current positions of the feature points Pi and Qj, and temporarily stores it within a feature point-to-feature point distance Register R.

The CPU, in step S9, compares the magnitude of the value stored in the shortest distance storage register R min with that of the value stored in the feature point-to-feature point distance storage register R. If the value of the feature point-to-feature point distance storage register R is smaller than that of the shortest distance storage register R min, the control program proceeds to step S10, in which the CPU resets the value of the feature point-to-feature point distance storage register R in the shortest distance storage register R min. If the value of the feature point-to-feature point distance storage register R is not smaller than that of the shortest distance storage register R min, the value stored within the shortest distance storage register R min is preserved intact.

The shortest distance storage register R min stores a possible maximum set value permitted by the system at the initial stage at which the processing is started, so that the judgment in step S9 results in "true", and accordingly, the shortest distance storage register R min newly stores the value of the feature point-to-feature point distance storage register R, or more specifically, the distance between the feature point P1 of the industrial robot A1 and the feature point Q1 of the industrial robot A2.

Subsequently, the CPU judges in step S11 whether or not the value of the retrieval index j has reached the final value. As far as the value of the retrieval index j has not reached the final value, a loop-like processing from the steps S6 to S11 is repeatedly performed until the result of the judgment in step S11 becomes "true". Then, all the distances between the feature point P1 of the industrial robot A1 and the feature point Qj (j=2 to the final value) are calculated, and each time a value of the distance between the feature points smaller than the current value of the shortest distance storage register R min is found, the value is updated into the shortest distance storage register R min and is preserved therein.

When the result of the judgment in step S11 becomes "true" through the repeated execution of the loop-like processing from step S6 to step S11, the CPU judges whether or not the value of the retrieval index i has reached the final value in step S12. Unless the value of the retrieval index i has reached the final value, thereafter the judgment processing from the step S3 to step S12 is repeatedly executed until the judgment in step S12 results in "true". Then, all the distances between the feature point Pi (i=2 to the final value) of the industrial robot A1 and the feature point Qj (j=1 to final value) are calculated, and each time a value of the distance between two feature points smaller than the current value of the shortest distance storage register R min is found, the value is updated into the shortest distance storage register R min and is preserved therein.

Accordingly, at the stage when the judgment in step S12 results in "true", the shortest distance storage register is allowed to preserve a distance between two points closest to each other in the relationship between the feature points Pi (j=1 to the final value) of the industrial robot A1 and its spot welder U1 and the feature points Qj (j=1 to the final value) of the industrial robot A2 and its spot welder U2, or more specifically, a shortest distance between the two robots.

After completing of the processing described above, the CPU in step S13 calculates a coefficient f (R min) based on the shortest distance R min and a function f previously programmed for the calculation of the function. A set reference value Vo for the manual feed rate stored in the nonvolatile RAM is multiplied by the coefficient f (R min) to find a feed rate Vo*f (R min)=V. Then, the CPU in step S14 distributes a pulse corresponding to one cycle among the axes of the industrial robot A1 or A2 specified through the teaching console panel W to execute the manual feeding at the feed rate V; calculates all the coordinates representing the current positions of the feature points Pi and Qj based on the current positions and postures of the industrial robots A1 and A2 by means of the simulation function described above; and updates and stores them into the nonvolatile RAM of the robot controller B.

Figure 3:
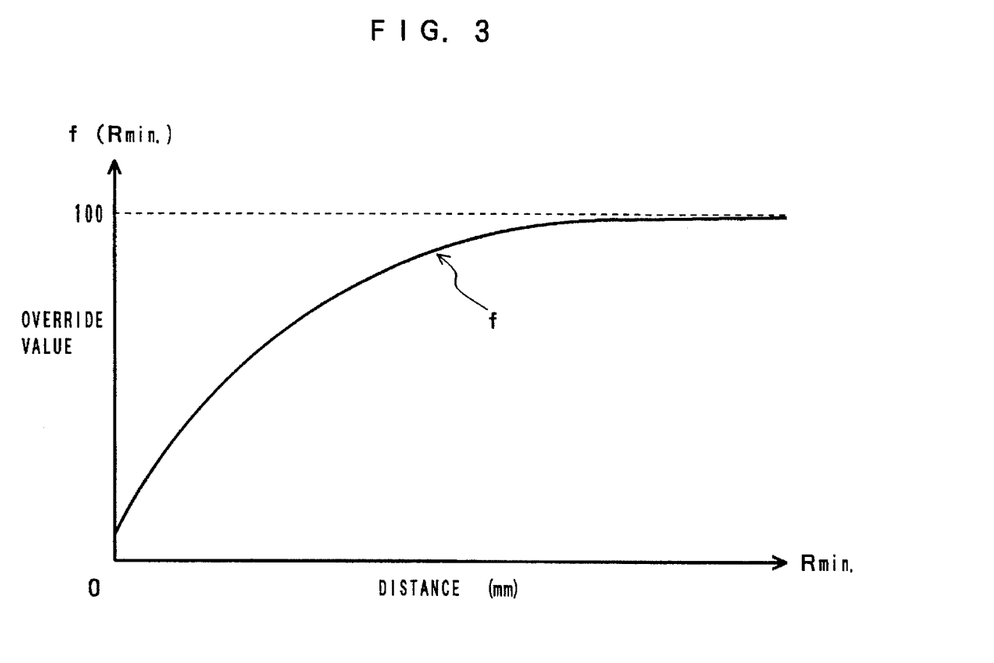
FIG. 3 is a graph showing an example of a monotonously increasing function used for finding a coefficient in a manual feed processing shown in FIG. 1.

FIG. 3 is a diagram showing an example of the function f for calculating the coefficient previously programmed in the ROM. The function f, having as an asymptote an override value of 100% is a monotonic increasing function in the form of a logarithmic function in which the value of the coefficient f (R min) decreases in an accelerating manner as the shortest distance R min decreases. Even though the value of R min becomes "0", the value of the coefficient f (R min) is maintained at an override value on the order of 10%.

In this way, after completing the "manual feed processing" for one cycle, the CPU repeatedly executes the "manual feed processing" described above until a manual feed command from the teaching console panel W based on the operation by the operator become undetectable. Thus, if the value of the shortest distance R min between the industrial robots A1 and A2 is diminished, the manual feed rate V is automatically reduced based on the function f shown in FIG. 3 to thereby prevent a damage which may be caused at the occurrence of a collision. On the other hand, if the value of the shortest distance R min between the industrial robots A1 and A2 is increased to eliminate any possibility of contact or collision, the manual feed rate V is automatically increased based on the function shown in FIG. 3 to thereby perform manual feeding efficiently. Thus, according to the present invention, there is no need for the operator to individually change the override value in view of the safety or the working efficiency each time the positional relationship between the industrial robots A1 and A2 varies as would be required in the conventional system. Thus, highly improved working efficiency is insured. For example, in the case where the industrial robots A1 and A2 varies both in the teaching mode, undergo teaching operations on the condition that the position and posture of the industrial robot A1 are first changed by a manual feed to bring it closer to the industrial robot A2; after conferring a teaching of the point for positioning on the industrial robot A1, the industrial robot A2 is manually fed to come closer to the industrial robot A1; and again the industrial robot A1 is manually fed, to obviate any possible contact or collision between the two industrial robots, it is necessary to start the manual feed operation after resetting the feed rate of the industrial robot A1 to a smaller value, since the distance between the industrial robots A1 and A2 at the stage of newly initiating the manual feed of the industrial robot A1 becomes shorter compared with the distance at the time when the first teaching of the point for positioning is conferred on the industrial robot A1. In the prior art, to perform such a resetting operation, the operator must manually operate the console panel W to select a new set value Vo as a reference value of the feed rate, and must reset the selected value into the nonvolatile RAM. In this embodiment, however, the above-described "manual feed processing" allows the manual feed rate V to be automatically reset each time the positions and postures of the industrial robots A1 and A2 vary due to the manual feed operation, which will completely eliminate such inconvenience as resetting the override value. Further, it will be appreciated that the set value Vo, intended to be a command value for the manual feed rate, is preset as a system parameter in the nonvolatile RAM, and also that the set value Vo may arbitrarily be reset in response to a command derived from the teaching console panel W in the same manner as in the prior art.

In the above embodiment, in order to secure a certain level of safety, several feature points Pi and Qj are defined at the locations at which the contours of the protruding members, such as the links and servomotors, and of the effectors of the industrial robots A1 and A2. Therefore, even in the case where the value of the shortest distance R min between the industrial robots A1 and A2 becomes "0", and thus it is nominally regarded as contact or collision state, actually there is a case where some distance still remains between the industrial robots A1 and A2. Since the value of the coefficient f (R min) is maintained at an override value on the order of 10% as shown in FIG. 3 even though the calculated value of the shortest distance R min is "0", it is possible under such state to manually feed the industrial robots A1 and A2 at a minute rate V so that the teaching operation can be performed even when the industrial robots A1 and A2 are brought even closer to each other. In this case, by virtue of the extremely small value of the actual manual feed rate V, there will be no damage to the industrial robots A1 and A2 even when actual contact or collision has occurred therebetween.

In lieu of calculating a coefficient f (R min) by programming a function f for the calculation of a coefficient as in the above embodiment, the processing for finding the coefficient may comprise the steps of dividing the horizontal axis shown in FIG. 3 segments at regular intervals; storing into the ROM a file which stores values of the coefficient f (R min) corresponding to each of the segments; retrieving, by processing in step 13, a segment including a shortest distance R min finally preserved within the shortest distance storage register through the "manual feed" processing; and finding a value of the coefficient f (R min) corresponding and thus retrieved segment for use as the coefficient.

Figure 4:
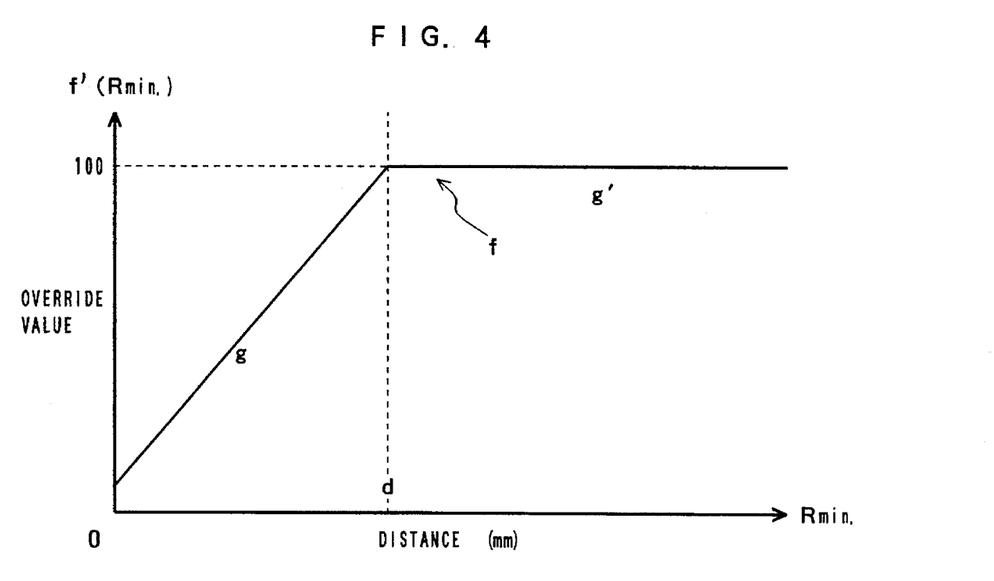
FIG. 4 is a graph showing another example of a monotonously increasing function for the calculation of the coefficient.

In the case where the actual manual feed rate V is set lower than the set value Vo for the manual feed rate only when the value of the shortest distance R min is not greater than the set distance d, the function f' shown in FIG. 4 is substituted for a function f shown in FIG. 3. The function f' is composed of a linear function g, which increases monotonously within a range R min <d, and a function g' whose value of function f'(R min) is a constant (override of 100%) within a range d <R min. Thus, in the case of using the function f', the magnitude of the shortest distance R min is compared with that of the set distance d through the processing in step S13, or more specifically, the "manual feed processing" described above. If R min <d, the expression g the monotonously increasing linear function is used to find a value of the coefficient f' (R min). If d<R min, then the override of 100% is output as the coefficient f' (R min) to execute an operation by expression Vo.f' (R min)=V. In the same manner as the above, the file may be used to execute this processing.

Although the above description has been given of the embodiment in which several feature points are defined on the protruding members such as the links and servomotors of the industrial robots A1 and A2, and the effectors U1 and U2 to execute the "manual feed processing", the shortest distance R min between the industrial robots A1 and A2 can be calculated by approximating the contours of the industrial robots A1 and A2 and effectors U1 and U2 to solid models having a simple shape such as a sphere, cylinder, rectangular parallelepiped or the combination thereof. Furthermore, in order to calculate a shortest distance R min between the industrial robots A1 and A2, strict current position and posture of each portion may be derived through the above-described simulation function by converting the shapes of the industrial robots A1 and A2 and effectors U1 and U2 into full shape data such as B-REP (Boundary Representation) or CSG (Constructive Solid Geometry), Although in this case, the amount of data representing the shapes of the industrial robots A1, A2 and effectors U1, U2 increases largely an algorithm for calculating the shortest distance R min itself is the same as the processings of the step S1 to step S12, that is, the "manual feed processing" described above. In the case of calculating the positions and postures of the industrial robots A1, A2 and the effectors U1, U2 by use of the shape data such as the B-REP and CSG, the result of calculation of the shortest distance R min agree well with the actual positions and postures, and, when the result of calculation of the shortest distance R min becomes "0", the industrial robots A1 and A2 will come even closer to each other than the case where the feature points are used for the calculation.

Thus, there must be provided such a function that when the result of calculation of the R min becomes "0", the value of f (R min) can be even smaller than the case of using the feature points, thereby lessening any possible damage which may occur at the collision.

Figure 5:
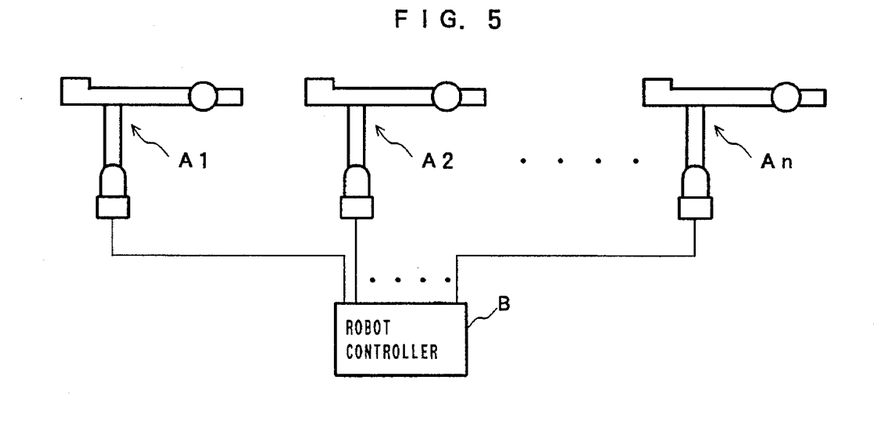
FIG. 5 is a schematic diagram showing an example where three or more industrial robots are drivingly controlled by a single robot controller.

Also, even in the case of drivingly controlling three or more industrial robots A1, A2, . . . An by a single robot controller B as shown in FIG. 5, manual feed rates for the industrial robots can automatically be adjusted by the "manual feed processing" shown in FIGS. 9 and 10, and based on substantially the same algorithm as the above-mentioned "manual feed processing". Referring now to flowcharts in FIGS. 9 and 10, there will be described a processing action in the case of drivingly controlling three or more industrial robots A1, A2, . . . An.

Figure 11:
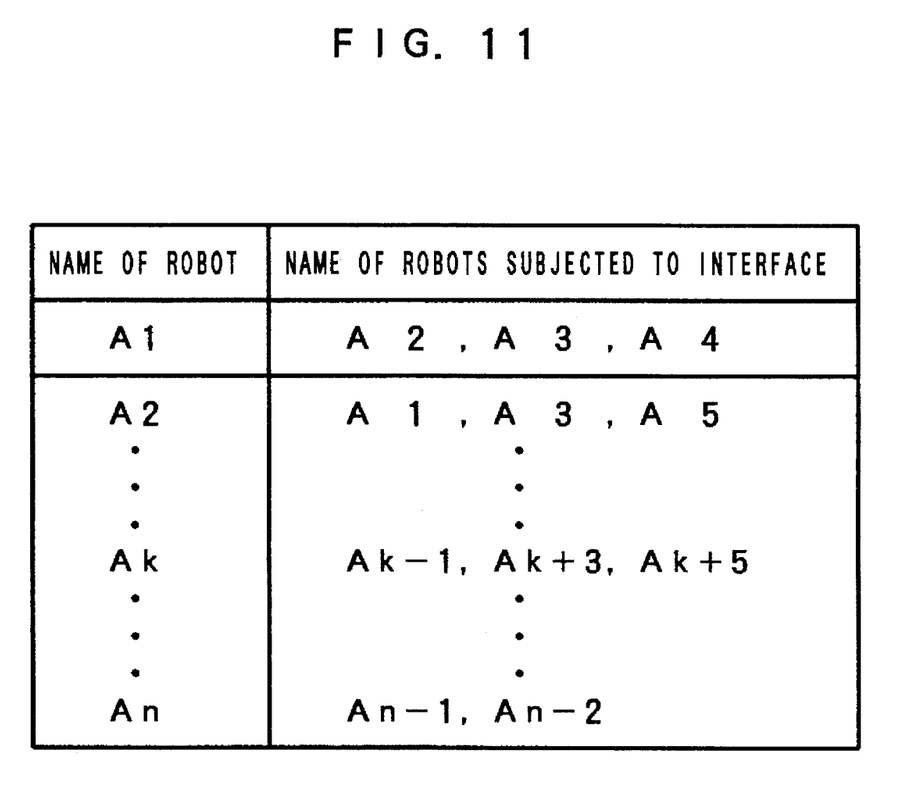
FIG. 11 shows a file storing code numbers of the robots which can be objects of interference for each individual robot.

In this embodiment, the nonvolatile RAM of the robot controller B is provided with a file as shown in FIG. 11. Into the file there can be set code numbers of the industrial robots A1, A2, . . . An as objects of interference correspondingly to code numbers of each robot when the installations of the robots by the user are completed.

Figure 9:
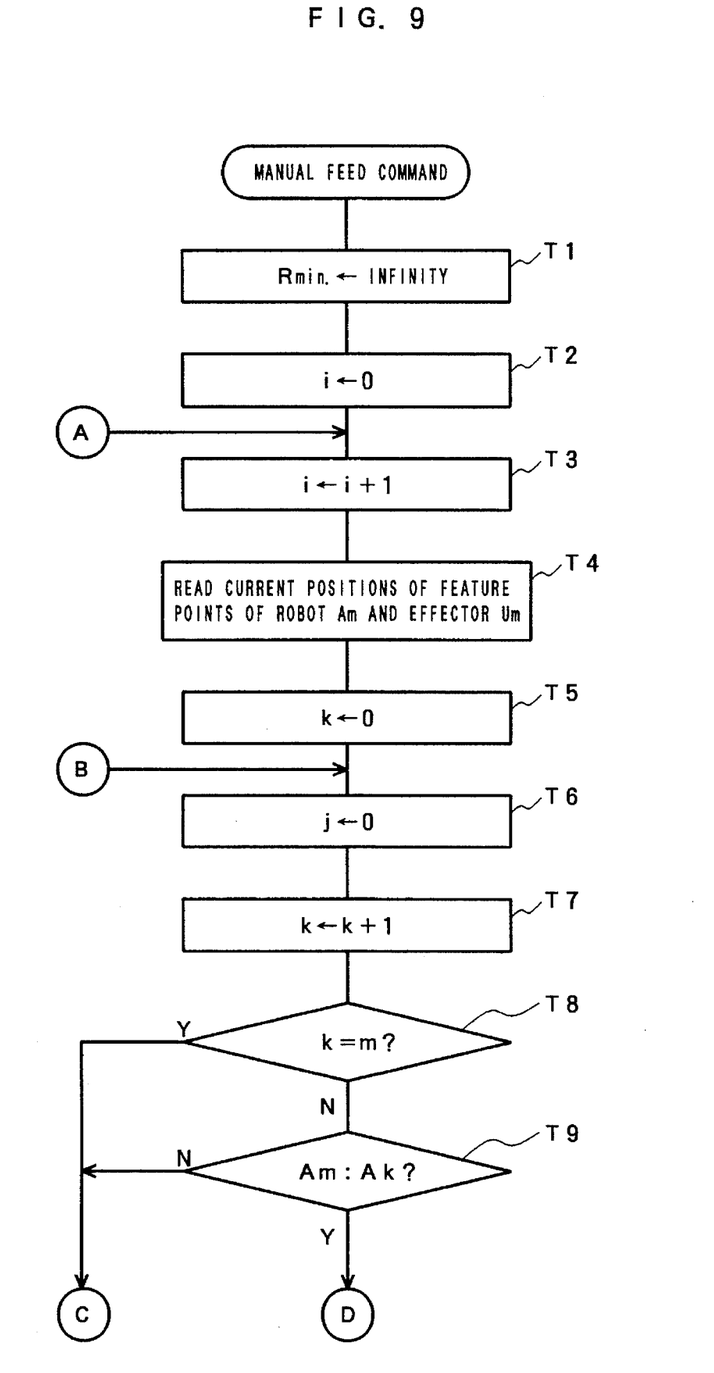
FIG. 9 is a flowchart showing a manual feed processing in accordance with another embodiment of the present invention.

When a manual feed command from the teaching console panel W is detected, the CPU initializes a possible maximum set value permitted by the system into the shortest distance storage register R min in step T1. After initializing the value of a retrieval index i to "0" in step T2, the index i is then incremented by "1" in step T3. In step T4, the CPU reads coordinates representing a current position of the i-th feature point Pi of the industrial robot Am (m=any one of 1 to n), which is to receive a manual feed command at that time, and stores them temporarily.

Then, the CPU initializes the value of a robot retrieval index k in step T5, and the value of a retrieval index j in step T8 to "0", respectively. Afterwards, in step T7, the robot retrieval index k is incremented by "1".

In step T8, it is judged whether or not the value of the index k coincides with m, or more specifically, whether or not the industrial robot Ak, for which a coordinate data representing current positions of the feature points is to be inputted, is identical with the industrial robot Am, for which a manual feed command at that time is inputted.

If the judgment in step T8 results in "false", and it is confirmed that the industrial robot Ak, for which data are to be read, is not identical with the industrial robot Am, which is the object of manual feed, the CPU advances to step T9 to judge whether or not the industrial robot Ak, for which data are read, is a robot having the possibility of interfering with the industrial robot Am, which is the object to be manual feed. In other words, if the industrial robot Ak, for which the data is to be read, is currently stored in the file means shown in FIG. 11 corresponding to the industrial robot Am, the object of the manual feed, the result of judgment in step T9 is "true", while it is "false" in all other cases.

Figure 10:
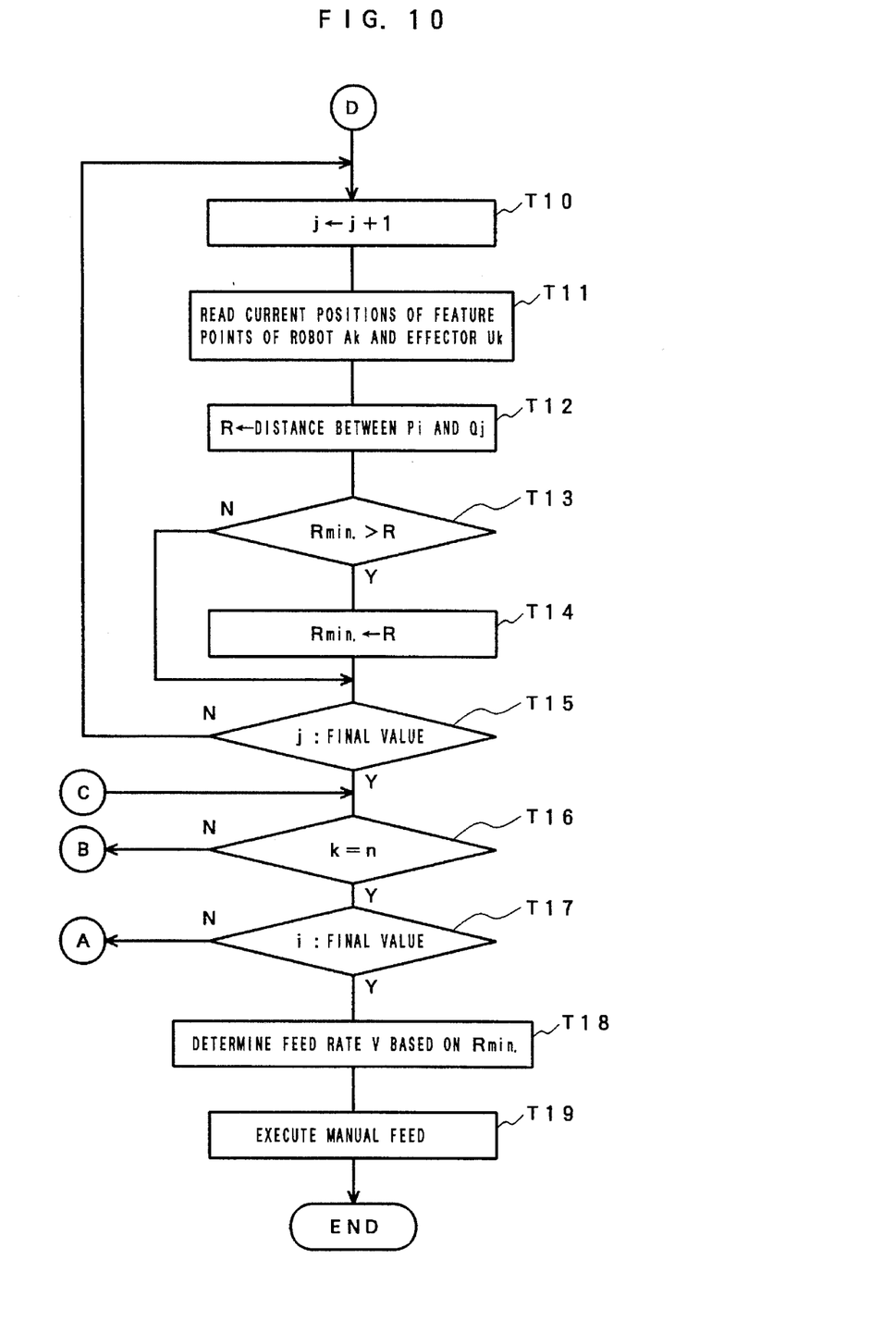
FIG. 10 is a continuation of the flowchart shown in FIG. 9.

Then, only when the judgment result in step T8 is "false", and the judgment result in step T9 is "true", the CPU repeatedly executes a loop-like processing covering step T10 to step T15, which is similar to the processing covering steps S6 to S11 or the above-described "manual feed processing", and preserves, within the shortest distance storage register R min, a distance between two points closest to each other in the relationship between the feature points Pi (i=1) of the industrial robot Am, for which a manual feed command at that time and of the associated spot welder Um have been inputted, and the feature points Qi (j=1 to a final value) of the industrial robot Ak and of the associated spot welder Uk, or more specifically, a distance from the feature points Pi (i=1) of the industrial robot Am and the associated spot welder Um to the feature points of the industrial robot Ak and the associated spot welder Uk which are located closest to the points Pi.

Then, the CPU, in step T16, judges whether or not the value of the robot retrieval index k reaches the total number n of the robots. Unless the index k reaches the total number n of the robots, the CPU returns to the processing of step T6, Afterwards, the CPU repeatedly executes the same processing as the above until the value of the robot retrieval index k reaches the total number of the robots. Then, with respect to all the feature points of all the robots which may interfere with the industrial robot Am, the CPU calculates distances therefrom to the feature points Pi (i=1) of the industrial robot Am, which receives the manual feed command for present and of the spot welder Um, and preserves the minimum value within the shortest distance storage register R min.

If the judgment result in step T8 is "true" or the judgment result in step T9 is "false", the processing covering step T10 to step T15 is not executed, thereby not only preventing the distance between the feature points from becoming "0" due to duplicately calculating the feature points of the industrial robot Am, itself but also eliminating the waste of time such as that for finding the shortest distance with respect to the robot having no possibility of interfering with the industrial robot Am.

During the repeated execution of the processing from the step T6 to step T16, when the judgment result in step T16 becomes "true", that is, the value of the robot retrieval index k reaches the total number n, the shortest distance storage register R min is allowed to store a distance from the feature points Pi (i=1) of the industrial robot, for which a manual feed command at that time has been inputted, and of the spot welder Um to the feature points of the industrial robot located closest thereto.

Subsequently, until the value of the retrieval index i reaches the final value, that is, until the judgment in step T17 results in "true", the CPU sequentially increments the value of the retrieval index by "1" for the repeated execution of the above-described processing, and sequentially finds the distances between the feature points of the industrial robot Am and the feature points of the other industrial robot which may interfere with the industrial robot Am. Then, each time there is calculated a distance between the feature points having a smaller value than the shortest distance, the value is updated and stored into the shortest distance storage register R min.

In this manner, at the stage when the judgment in step T17 results in "true", there can be preserved within the shortest distance storage register R min a distance between the two points closest to each other in the relationship between the feature points Pi (i=1 to the final value) of the industrial robot Am, which is to receive a manual feed command at that time, and of the spot welder Um and the feature points Qj (j=1 to the final value) of the industrial robots A2, A3, . . . An, or more specifically, a shortest distance between the industrial robot Am and the industrial robot which is located closest to the industrial robot Am.

Thereafter, the CPU executes the processing of steps T18 and T19 in the same manner as that of the steps S13 and S14 in the "manual feed processing" described above, thereby adjusting the manual feed rate for the industrial robot Am, for which a manual feed command at that time has been inputted. This embodiment will present substantially the same function and effect as the foregoing embodiment, and hence, it may have as many variants as those of the above embodiment.

Figure 6:
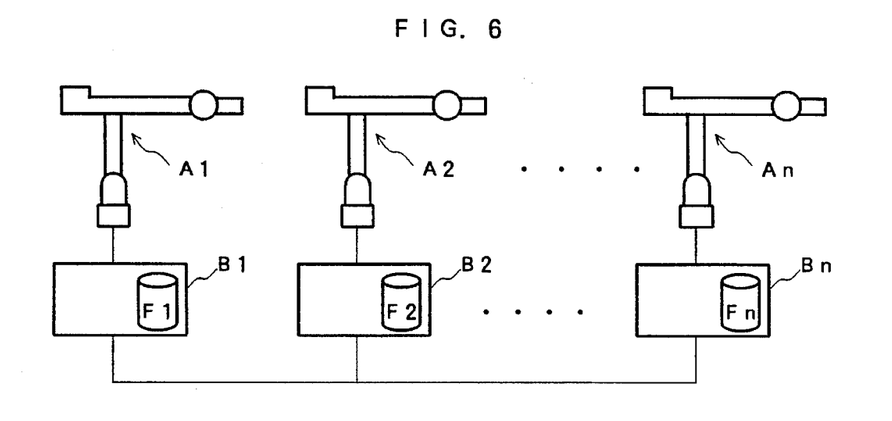
FIG. 6 is a schematic diagram showing an example where a plurality of industrial robots are drivingly controlled by a plurality of robot controllers, each associated with each individual robot.

In driving controlling the industrial robots A1, A2, . . . An by individually associated robot controllers B1, B2, . . . Bn, the manual feed rate of each industrial robot can be adjusted in the same manner as the processing shown in FIGS. 9 and 10, or more specifically, by electrically connecting the industrial robots A1, A2, . . . An with the associated robot controllers B1, B2, . . . Bn by way of communication lines; calculating values of coordinates representing current positions of feature points of the robots A1, A2, . . . An by respective robot controllers B1, B2,... Bn; updating and storing the calculated values into storage means F1, F2, Fn, respectively, of the robot controllers; sequentially reading data on the feature points stored within the storage means F1, F2, . . . Fn into the robot controller associated with the robot as the object of a manual feed; and calculating the distance between the feature points by the robot controller of the robot to be manually fed.

Figure 7:
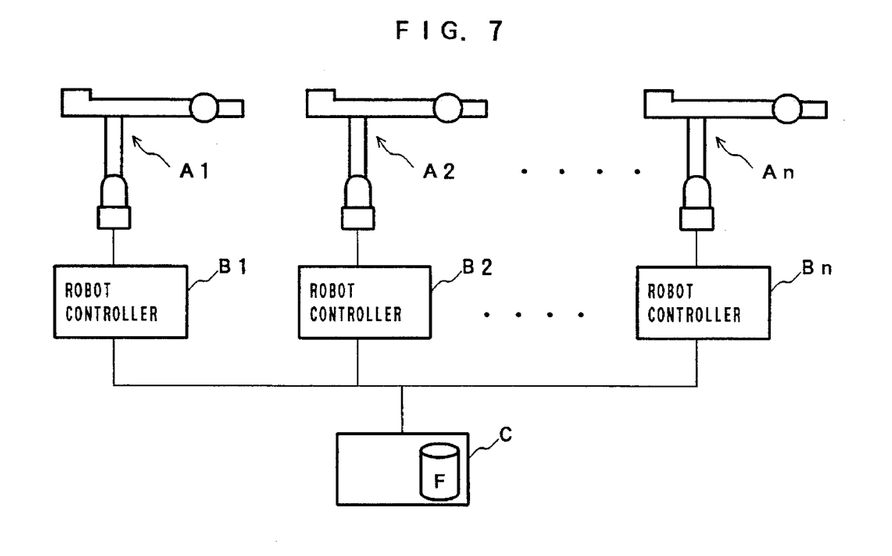
FIG. 7 is a schematic diagram showing an example where a plurality of industrial robots are drivingly controlled by a single cell controller and a plurality of robot controllers, each associated with each individual robot.

Also, as shown in FIG. 7, in the case of not only driving and controlling the industrial robots A1, A2,. . . An by individually associated robot controllers B1, B2, . . . Bn but also performing a cooperative action of the entirety by providing a cell controller C, the data on the distances between the feature points of the robots A1, A2,. . . An are collectively and sequentially stored into a storage means F with the aid of the cell controller C, and then the data stored within the storage means F are sequentially read into the robot controller associated with the robot as an object of a manual feed for the processing as shown in FIGS. 9 and 10.

Figure 8:
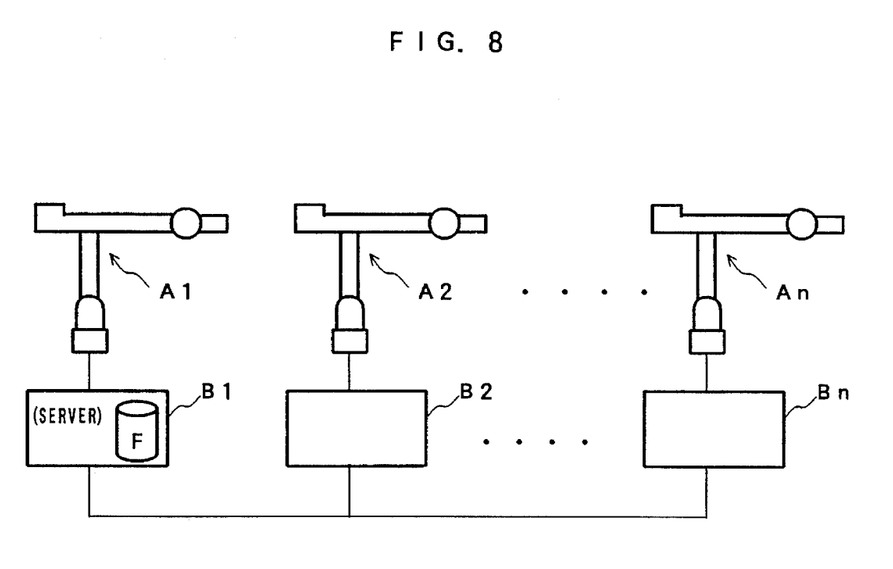
FIG. 8 is a schematic diagram showing an example where a plurality of industrial robots are drivingly controlled by a plurality of robot controllers, each associated with each individual robot, one of the controllers acting as a server.

The same applies to the case where, without providing a separate cell controller as shown in FIG. 8, a storage means F is arranged within any one of the robot controllers B1, b2,. . . Bn so that the robot controller provided with the storage means F acts as a server means similar to the cell controller as is shown in FIG. 7.

What is claimed is:

1. A method of manually feeding a plurality of robots arranged at positions having a possibility of interfering with one another, said method comprising the steps of:

(a) automatically finding the shortest distance between one robot of said plurality of robots, for which a manual feed command is inputted by an operator, and the other robots of said plurality of robots based on current positions and postures of said plurality of robots;

(b) setting a manual feed rate lower as said shortest distance decreases; and (c) performing a manual feed of the one robot at said manual feed rate set in said step (b).

2. A method of manually feeding a plurality of robots according to claim 1, wherein said step (b) comprises the step of:

(b1) multiply a previously commanded reference value of the manual feed rate by a coefficient which monotonously increases as said shortest distance increases to determine an actual manual feed rate.

3. A method of manually feeding a plurality of robots according to claim 1, wherein said step (b) comprises the step of:

(b1) setting an actual manual feed rate lower than a previously commanded manual feed rate only when said shortest distance is smaller than a preset distance.

4. A method of manually feeding a plurality of robots according to claim 1, wherein said step (a) comprises the steps of:

(a1) defining several feature points on said plurality of robots and effectors mounted on said plurality of robots, each robot of said plurality of robots having respective feature points and effectors;

(a2) calculating all distances between coordinates representing current positions of said feature points of the one robot, for which a manual feed command is inputted by the operator and respective coordinates representing respective current positions of said respective feature points of each robot of said other robots; and (a3) determining said shortest distance to be a minimum value of said calculated distances.

5. A method of manually feeding a robot according to claim 4, wherein said step (b) comprises the step of:

(b1) multiplying a previously commanded reference value of manual feed rates by a coefficient which monotonously increases as said shortest distance increases, to determine an actual manual feed rate.

6. A method of manually feeding a robot according to claim 4, wherein said step (b) comprises the step of:

(b1) setting an actual manual feed rate lower than a previously commanded manual feed rate only when said shortest distance is smaller than a preset distance.

7. A method of manually feeding a robot according to claim 1, wherein said step (a) comprises the steps of:

(a1) approximating each of shapes of links of said plurality of robots and shapes of effectors mounted on said plurality of robots, to combinations of solid models having simple shapes and storing the solid models as shape data, each robot having a respective solid model;

(a2) calculating coordinates representing current positions of the respective solid model of the one robot, for which a manual feed command is inputted by the operator and coordinates representing respective current positions of the respective solid models of the each robot of the other robots;

(a3) determining said shortest distance between the one robot and the other robots based on the coordinates representing said respective current positions thus calculated.

8. A method of manually feeding a robot according to claim 7, wherein said step (b) comprises the step of:

(b1) multiplying a previously commanded reference value of manual feed rates by a coefficient, which monotonously increases as said shortest distance increases, to determine an actual manual feed rate.

9. A method of manually feeding a robot according to claim 7, wherein said step (b) comprises the step of:

(b2) setting an actual manual feed rate lower than a previously commanded manual feed rate only when said shortest distance is smaller than a preset distance.

* * * * *

UNITED STATES PATENT AND TRADEMARK OFFICE
CERTIFICATE OF CORRECTION

PATENT NO. : 5,485,389                                  Page 1 of 2
DATED : January 16, 1996
INVENTOR(S) : Tomoyuki Terada et al It is certified that error appears in the above-indentified patent and that said Letters Patent is hereby corrected as shown below:

Column 2, line 63, before "FIG. 10" insert paragraph indentation.

Column 3, line 12, delete "hi" and insert --H1--;

line 16, change "," to --.--;

line 55, after "Thus, insert --,--; and line 63, change "," to --.--.

UNITED STATES PATENT AND TRADEMARK OFFICE
CERTIFICATE OF CORRECTION

PATENT NO.  : 5,485,389
DATED       : January 16, 1996
INVENTOR(S) : Tomoyuki Terada et al It is certified that error appears in the above-indentified patent and that said Letters Patent is hereby corrected as shown below:

Column 4, line 15, delete "2" and insert –S2–.

Column 6, line 7, change ";" to –,–; and line 46, after "10%" insert –,– and after "3" insert –,–.

Column 8, line 59, change "," to –.–.

Column 9, line 8, delete "Am, itself" and insert –Am itself,–.

Signed and Sealed this

Ninth Day of April, 1996

Attest:

BRUCE LEHMAN

Attesting Officer

Commissioner of Patents and Trademarks